United States Patent
Dal et al.

(10) Patent No.: US 9,527,460 B2
(45) Date of Patent: Dec. 27, 2016

(54) MODULAR INVERTER RACK AND ITS CONTROL METHOD FOR A SET OF ELECTRICAL MACHINES PROVIDED WITH POSITION SENSORS

(71) Applicant: THALES, Neuilly sur Seine (FR)

(72) Inventors: Arnaud Dal, Chatou (FR); Stéphane Guguen, Chatou (FR); Tony Texeira, Chatou (FR)

(73) Assignee: Thales, Courbevoie (FR)

( * ) Notice: Subject to any disclaimer, the term of this patent is extended or adjusted under 35 U.S.C. 154(b) by 389 days.

(21) Appl. No.: 14/158,501

(22) Filed: Jan. 17, 2014

(65) Prior Publication Data

US 2014/0203631 A1    Jul. 24, 2014

(30) Foreign Application Priority Data

Jan. 18, 2013    (FR) .................................. 13 00103

(51) Int. Cl.
| | |
|---|---|
| *B60R 16/03* | (2006.01) |
| *H02P 5/74* | (2006.01) |
| *H02P 6/14* | (2016.01) |
| *H02M 7/493* | (2007.01) |

(52) U.S. Cl.
CPC ................. *B60R 16/03* (2013.01); *H02P 5/74* (2013.01); *H02P 6/14* (2013.01); *H02M 7/493* (2013.01)

(58) Field of Classification Search
CPC ....................................................... H02P 5/74
USPC ........................................................ 307/9.1
See application file for complete search history.

(56) References Cited

U.S. PATENT DOCUMENTS

| | | | |
|---|---|---|---|
| 3,757,179 A | 9/1973 | Pedersen | |
| 5,670,856 A * | 9/1997 | Le ........................ | G05D 1/0077 244/194 |
| 8,810,179 B2 * | 8/2014 | De Wergifosse ..... | H02M 7/493 318/400.21 |
| 2006/0006829 A1 * | 1/2006 | Anghel ................... | H02P 9/009 318/719 |
| 2007/0273310 A1 | 11/2007 | Foch et al. | |
| 2008/0205097 A1 * | 8/2008 | Miettinen ............. | H02M 7/537 363/40 |
| 2011/0266987 A1 * | 11/2011 | Markunas ............. | H02P 21/146 318/400.24 |

(Continued)

FOREIGN PATENT DOCUMENTS

| | | |
|---|---|---|
| FR | 2899040 A1 | 9/2007 |
| FR | 2955719 A1 | 7/2011 |
| WO | 2012031621 A1 | 3/2012 |

*Primary Examiner* — Adi Amrany
(74) *Attorney, Agent, or Firm* — Baker & Hostetler LLP

(57) ABSTRACT

A modular rack intended for an aircraft includes a set of electrical machines each equipped with a position sensor including inverters, a supervision member, a first communication channel to transmit to each of the inverters the inverter setpoint determined by the supervision member, and a second communication channel to transmit a position information item to each of the inverters, each of the inverters including a way to generate an electrical signal as a function of the inverter setpoint and of the position information transmitted by the supervision member. The first and second communication channels include a single link for the supervision member and the inverters, and transmitting both the inverter setpoints and the position information items.

10 Claims, 3 Drawing Sheets

(56) References Cited

U.S. PATENT DOCUMENTS

2011/0279074 A1* 11/2011 Yeh .................... G01K 7/42
                                                    318/432
2013/0009580 A1   1/2013 Dewergifosse

* cited by examiner

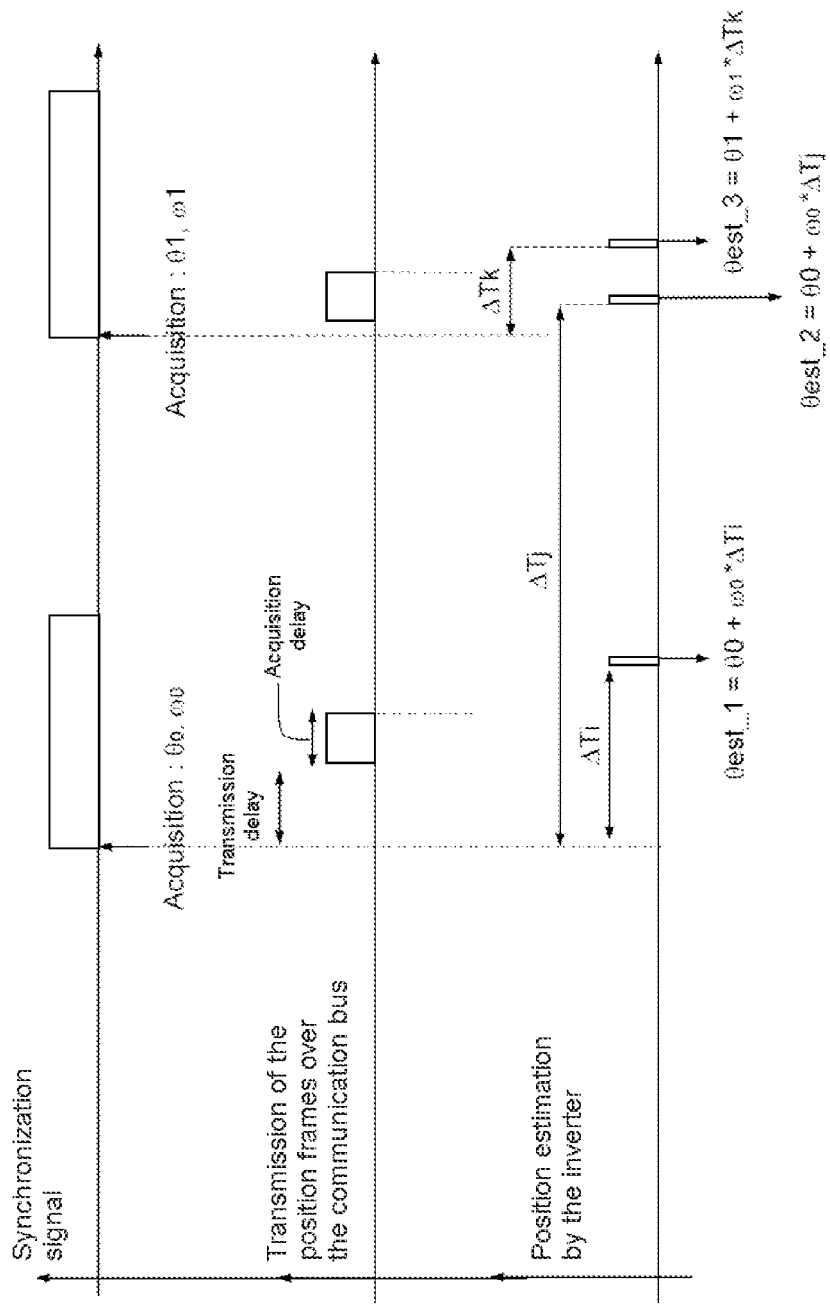

MODULAR INVERTER RACK AND ITS CONTROL METHOD FOR A SET OF ELECTRICAL MACHINES PROVIDED WITH POSITION SENSORS

CROSS-REFERENCE TO RELATED APPLICATIONS

This application claims priority to foreign French patent application No. FR 1300103, filed on Jan. 18, 2013.

FIELD OF THE INVENTION

The present invention relates to electrical systems for the control of electrical machines with which an aircraft is equipped. More particularly, it relates to a modular inverter rack and its control method that are intended for an aircraft comprising a set of electrical machines provided with position sensors.

BACKGROUND

An aircraft generally comprises a number of electrical machines distributed throughout the aircraft to fulfill a set of miscellaneous functions. Electrical machines are, for example, known that are dedicated to the starting up of a propulsion turbine, to an air conditioning set for the passenger compartment of the aircraft, or even dedicated to the operation of the aerodynamic control surfaces of the aircraft. For these functions, there are notably direct current electrical machines, asynchronous or synchronous, three-phase, six-phase or, more generally, polyphase. These electrical machines consume electrical power available on the onboard network of the aircraft, and, for example, supplied by a generator linked to a turbine or else supplied by an airport network when the aircraft is on the ground.

It is known that it is essential to have reliable information on the position of the rotor of the electrical machine. Any measurement error on the position significantly increases the electrical losses. Typically, an error of less than 5% on the real position is generally sought, the impacts on the machine being considered to be acceptable (weight penalty linked to the machine overdimensioning, additional costs, notably for cooling, etc.). The electrical machines implemented on board an aircraft exhibit high rotation speeds, of the order of 10 000 to 50 000 rpm, making it necessary to have rotor position information at high frequency, typically of the order of 8 to 40 kHz. There are a number of techniques for evaluating the position of the rotor. A variety of sensors are known providing a physical measurement of the position, there are also computation means making it possible to evaluate this position as a function of the voltages and currents measured in each of the phases of the machine.

In a conventional electrical architecture of an aircraft, each electrical machine has an inverter linked to the onboard network which formats the signal supplying each of the phases in accordance with the needs of the machine. In the case of an electrical machine equipped with a position sensor, the inverter relies on the rotor position information supplied by the position sensor to determine the stator current and voltage setpoints, and possibly the rotor current and voltage setpoints for wound rotor machines.

This architecture in which an inverter is assigned to a single electrical machine has limitations that the invention seeks to resolve. For example, the inverter dedicated to an electrical machine responsible for starting the turbine is used only when the aircraft is on the ground prior to take-off. In flight, the unused inverter represents an unnecessary weight and cost overhead. Similarly, a failure of an inverter renders an otherwise operational electrical machine unusable. For these reasons, it is desirable to have a more modular electrical architecture, which would make it possible to modify the assignment of an inverter between a number of machines. A modular power rack is envisaged controlling the supply of a set of electrical machines distributed throughout the aircraft by means of a set of inverters. Producing such a modular rack comes up against the difficulties of management of the position information for the set of machines, and in particular the pooling of the high frequency position information items and their transmission without degradation (error, delay) to the inverters concerned.

SUMMARY OF THE INVENTION

To this end, the subject of the invention is a modular power rack intended for an aircraft comprising a set of electrical machines each equipped with a position sensor, and an onboard electrical network. The modular power rack comprises:
  a number of inverters, supplied with electrical power by the onboard electrical network,
  a supervision member comprising means for:
    collecting, for each electrical machine, a machine control setpoint, and position information delivered by the position sensor of the electrical machine,
    determining, for each inverter, an inverter setpoint from the machine control setpoints of the set of electrical machines,
  a first communication channel, between the supervision member and each of the inverters, making it possible to transmit to each of the inverters the inverter setpoint determined by the supervision member,
  a second communication channel, between the supervision member and each of the inverters, making it possible to transmit position information to each of the inverters,
  a distribution device, which supplies to each electrical machine an electrical supply signal assembled from power electrical signals generated by the inverters,
each of the inverters comprising means for generating a power electrical signal as a function of the inverter setpoint and of the position information transmitted by the supervision member respectively via the first and the second communication channels.

The invention relates also to a control method intended for an aircraft comprising a set of electrical machines each equipped with a position sensor, and a number of inverters supplied with electrical power by an onboard network of the aircraft. The method comprises the steps consisting in:
  collecting, for each electrical machine, a machine control setpoint and position information delivered by the position sensor of the electrical machine,
  determining, for each inverter, an inverter setpoint from the machine control setpoints of the set of electrical machines,
  generating, by each inverter, an electrical power signal as a function of the inverter setpoint and of the position information,
  supplying to each electrical machine a supply electrical signal assembled from power electrical signals generated by one or more inverters.

BRIEF DESCRIPTION OF THE DRAWINGS

The invention will be better understood and other advantages will become apparent on reading the detailed description of embodiments given by way of example in the following figures.

FIG. 3 illustrates the principle of operation of a modular power rack according to the invention.

In the interests of clarity, the same elements will bear the same references in the different figures.

DETAILED DESCRIPTION

Figure 1:
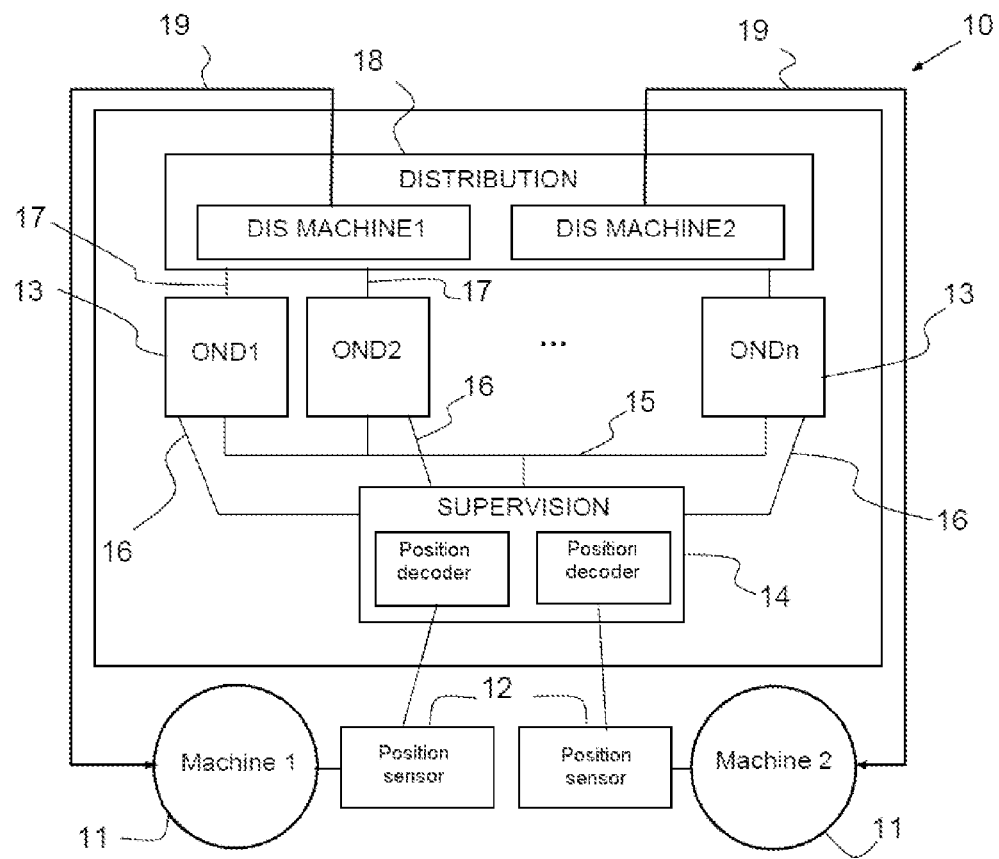
FIG. 1 represents the main components of a modular power rack according to a first embodiment of the invention.

FIG. 1 represents the main components of a modular power rack according to a first embodiment of the invention. A modular power rack 10 is intended for an aircraft comprising a set of electrical machines 11. Each electrical machine 11 is equipped with a position sensor 12.

The modular power rack comprises a number of inverters 13, supplied with electrical power by an onboard electrical network of the aircraft (not represented in the figure).

The modular rack also comprises a supervision member 14. This supervision member comprises means for collecting, for each electrical machine 11, a machine control setpoint CONS_MAC. These machine control setpoints can be transmitted directly by the machine or by various devices or computers distributed on the aircraft which use or control the machine. Typically, a computer responsible for managing the passenger compartment temperature transmits a control setpoint to the supervision member of the modular power rack, for an electrical machine linked to an air conditioning set. A machine control setpoint therefore consists of a set of values necessary to the control of the machine. Among these values, a machine rotor rotation speed setpoint, generally associated with an electrical power limitation, or even a startup command notably come to mind. The supervision member 14 also comprises means for collecting, for each electrical machine 11, a position information item referenced $\theta_0$, delivered by the position sensor 12 of each electrical machine 11. As has already been mentioned, various types of position sensors providing a physical measurement of the position of the rotor are possible. Each electrical machine can be equipped with a specific sensor. The modular rack is linked by a physical measurement allowing for the transmission of the position information $\theta_0$ from each electrical machine to the supervision member.

The supervision member 14 also comprises means for determining, for each inverter 13, an inverter setpoint CONS_OND from the machine control setpoints CONS_MAC of the set of electrical machines 11. Thus, the supervision member ensures the distribution and the assignment of each of the inverters 13 to respond optimally to the need expressed by the machine control setpoints of the set of electrical machines. It can, for example, assign a number of inverters to the electrical supply of an electrical machine, for determining, for each of these inverters, an inverter setpoint, making it possible, after assembly of the electrical signals from these inverters, to supply a machine in accordance with its machine control setpoint. Thus, an inverter dedicated to the starting up of a turbine prior to take-off will be able, during the flight, to be used to supply a machine to cover another need.

It should also be noted that these means, enabling the supervision member to collect machine control setpoints and position information, and determine inverter setpoints, implement various computation algorithms, notably those described hereinbelow for the modular rack control method. In practice, these computation algorithms are hosted in an electronic computer constituting the supervision member.

The modular power rack 10 comprises a first communication channel 15, between the supervision member 14 and each of the inverters 13, making it possible to transmit to each of the inverters 13 the inverter setpoint CONS_OND determined by the supervision member 14. Preferentially, this communication channel 15 is a bus link, containing, in a multiplexed manner, all the inverter setpoints CONS_OND. The communication bus 15 and the inverters 13 are configured in such a way that each inverter takes the inverter setpoint CONS_OND that relates to it.

The modular power rack 10 also comprises a second communication channel 16, between the supervision member 14 and each of the inverters 13, making it possible to transmit position information $\theta_0$ to each of the inverters 13. In this first embodiment, the second communication channel 16 consists of a set of links. A link, preferentially a bus link, links each inverter 13 to the supervision member 14 as represented in FIG. 1.

From the inverter setpoint CONS_OND and from the position information $\theta_0$, received from the supervision member 14, respectively via the first and the second communication channels, each inverter generates a power electrical signal 17.

The modular power rack 10 comprises a distribution device 18, which supplies to each electrical machine 11 an electrical supply signal 19 assembled from the power electrical signals 17 generated by the inverters 13.

This first embodiment advantageously makes it possible to decouple the transmission to the inverters of the inverter setpoints CONS_OND and the transmission of each of the position information items $\theta_0$. As has already been indicated, the optimized control of an electrical machine, that is to say by limiting the electrical losses, requires the availability of accurate position information, and implies transmitting, without error or delay and with a high frequency, this information from the position sensor 12 to the inverter concerned. On the other hand, the requirement concerning the transmission of the inverter setpoint is generally less strong. The decoupling of the two transmission channels advantageously makes it possible to dimension the modular rack as appropriately as possible to these two needs.

Figure 2:
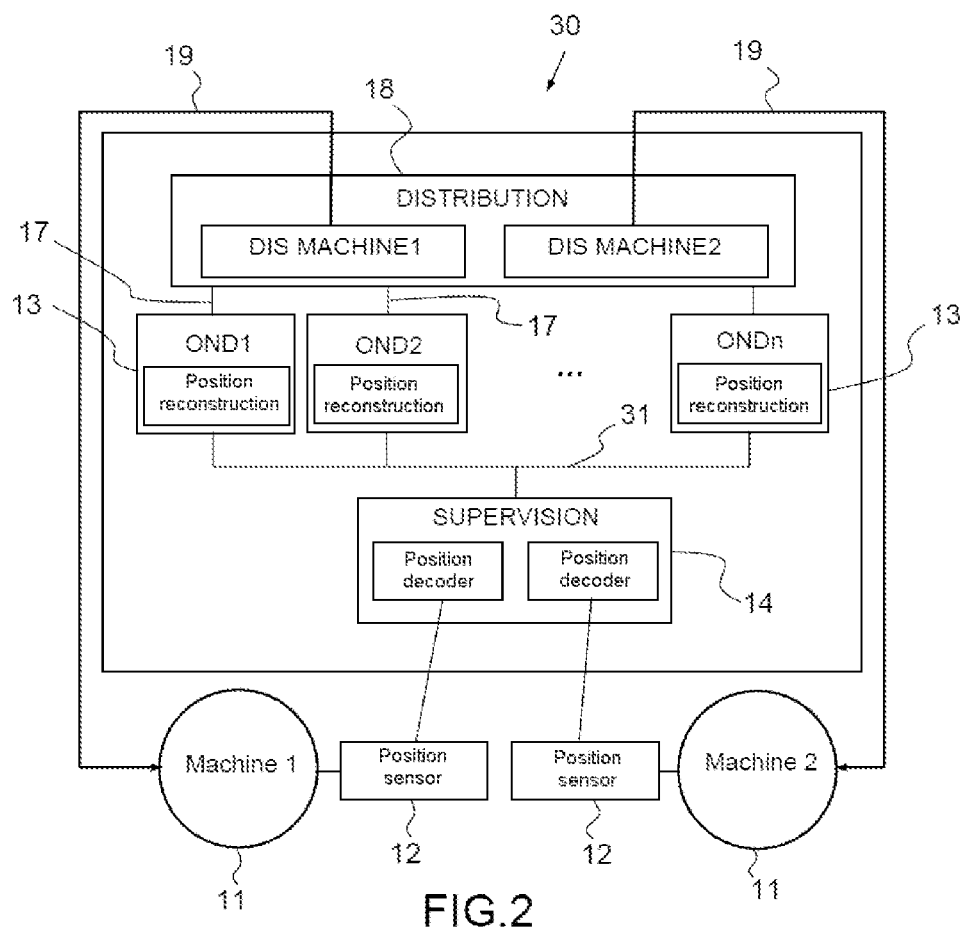
FIG. 2 represents the main components of a modular power rack according to a second embodiment of the invention.

FIG. 2 represents the main components of a modular power rack according to a second embodiment of the invention. This embodiment reprises some of the components described in the case of FIG. 1. Thus, the modular power rack 30 is intended for an aircraft comprising a set of electrical machines 11; each electrical machine 11 being equipped with a position sensor 12.

The modular power rack 30 also comprises a number of inverters 13, and the supervision member 14. As described previously, the supervision member 14 comprises means for:
 collecting, for each electrical machine 11, a machine control setpoint CONS_MAC, and position information $\theta_0$ delivered by the position sensor 12 of the electrical machine, determining, for each inverter 13, an inverter setpoint CONS_OND from the machine control setpoints CONS_MAC of the set of electrical machines.

The modular power rack 30 also comprises a distribution device 18, which supplies to each electrical machine 11 an electrical supply signal 19 assembled from the power electrical signals 17 generated by the inverters 13; each of the inverters 13 comprising means for generating the power electrical signal 17 as a function of the inverter setpoint CONS_OND and of the position information $\theta_0$ transmitted by the supervision member.

In this second embodiment, the position information items $\theta_0$ and the inverter setpoints CONS_OND are transmitted by means of a single link 31. In other words, the first and the second communication channels consist of a single link 31 linking the supervision member and the inverters, and transmitting both the inverter setpoints and the position information. Preferentially, the link is a bus link, containing, in a multiplexed manner, all the inverter setpoints CONS_OND and position information items $\theta_0$. The communication bus 31 and the inverters 13 are configured in such a way that each inverter takes the inverter setpoint CONS_OND and the position information item $\theta_0$ that relates to it.

This second embodiment advantageously makes it possible to simplify the electrical architecture of the modular power rack. The wiring between the supervision member and the inverters is significantly simplified. The electrical connection interface of the supervision member is also considerably simplified.

As has already been specified, it is appropriate to have, on the inverter, accurate information, without error or delay, to limit the electrical losses. A first solution, applicable to the two embodiments described previously, consists in dimensioning the communication channels transmitting the position information, respectively referenced 16 and 31 in FIGS. 1 and 2, so as to transmit a position information item at high frequency. A second solution proposed by the present invention and applicable to the two embodiments described previously, consists in transmitting a position information item at lower frequency and in providing each inverter with means for estimating position at a higher frequency, compatible with the control demands of the electrical machines.

For this, the modular power rack advantageously comprises synchronization means which associates a date stamp $t_0$ with each position information item delivered by the position sensors 12 of each of the electrical machines 11. The date stamp $t_0$ associated with position information $\theta_0$ being also transmitted via the second communication channel. In this second solution, the inverters comprise computation means, for determining an estimated position $\theta_{est}$ from the position information $\theta_0$ transmitted to the inverter 13 by the supervision member 14. The purpose of these computation means is to determine an estimated position $\theta_{est}$ at a higher frequency than the transfer frequency of the position information $\theta_0$ specific to the second communication channel, 16 or 31.

When the bus bit rate is too low to ensure the refreshing of the position information at an adequate frequency for the inverter, the inverter reconstructs a high frequency position information item using an estimator, preferentially of the type:

$$\theta_{est}=\theta_0+\omega_0\times\Delta t+\gamma_0\times\Delta t^2+\ldots$$

in which $\theta_{est}$, $\theta_0$, $\omega_0$, $\gamma_0$ and $\Delta t$ respectively represent the estimated position, the position information transmitted to the inverter, a rotation speed of the rotor estimated by the inverter, an acceleration of rotation of the rotor estimated by the inverter, and an estimation of time elapsed since the date stamp $t_0$.

The inertias of the machines are relatively great, so the estimated position is generally computed by means of a first order estimator, that is to say one that implements the following relationship:

$$\theta_{est}=\theta_0+\omega_0\times\Delta t$$

or alternatively of a second order estimator, that is to say one that implements the following relationship:

$$\theta_{est}=\theta_0+\omega_0\times\Delta t+\gamma_0\times\Delta t^2$$

Note that the rotation speed, and/or the acceleration of rotation are preferentially computed by means of two successive position information items $\theta_0$; this computation being able to be performed by the inverter, or alternatively by the supervision member and transmitted over the bus.

Note also that a number of synchronization means are envisaged by the present invention. In a first variant, the synchronization means implement an additional physical signal. In a second variant, the synchronization means use synchronization bits in the frames of the communication bus.

This solution that consists in recomputing, on the inverter, a position information item suited to the need to the electrical machine, is particularly advantageous because it makes it possible to limit the frequency demand for the second communication channel transmitting the position information to the inverter. In the case of the second embodiment described in FIG. 2, it becomes possible to implement a single communication bus, having a reasonable bus bit rate, while limiting the electrical losses, by a recomputation on each inverter of a position that is suited to the operation of the electrical machine being controlled. The synchronization of the sensor position information ensures the availability of accurate information on the estimated position, making it possible to limit the electrical losses.

Note that, for the two embodiments represented in FIGS. 1 and 2, the set of communication buses will be able to be made redundant for safety reasons in flight. This would be in particular for the communication channels 15, 16 and 31.

Note also that the modular rack described in FIGS. 1 and 2 is intended for an aircraft comprising a set of electrical machines equipped with a position sensor. The modular power rack represented and described provides for each electrical machine to be equipped with a position sensor. Obviously, the invention applies in the same way to an aircraft comprising a set of electrical machines of which a first subset is equipped with position sensors, and a second subset has no position sensors. In such a configuration, the invention applies to the first subset of electrical machines each equipped with a position sensor. Obviously, it is envisaged that all the physical components of the modular power rack according to the invention making it possible to control the first subset can be integrated in a device combining other physical components making it possible to control the second subset.

FIG. 3 illustrates the principle of operation of a modular rack of which an inverter comprises means for computing an estimated position. The first timing diagram in the top part represents the synchronization signal used by the computation means of the inverter. The second timing diagram in the intermediate part represents the position information $\theta_0$ received by the inverter via the second communication channel. The third timing diagram in the bottom part represents the position estimated $\theta_{est}$ by the computation means of the inverter.

The computation of an estimated position $\theta_{est}$ by the inverter is subject to the pacing of the synchronization clock. On each rising edge of the clock, a position information item $\theta_0$ is transmitted by the supervision member. This position information item becomes available on the inverter after a certain delay, comprising a transmission delay via the communication channel and an acquisition delay by the inverter. This position information item $\theta_0$ has an associated date stamp $t_0$.

As represented in the third timing diagram, if the control of the electrical machine requires a position information item at a time $t_0 + \Delta Ti$, the inverter which has the computation means previously described, determines an estimated position $\theta_{est\_1}$ as a function of $\theta_0$ and $\Delta Ti$. Similarly, the computation of the position $\theta_{est\_2}$ illustrates the case where the control of the electrical machine requires a position information item and that the position information item is not yet available on the inverter. In this case, the inverter determines $\theta_{est\_2}$ by means of the information $\theta_0$ from the preceding time step and by means of the delay $\Delta Tj$. As soon as the position information item $\theta_1$ for the next time step is available, the computation of the estimated position uses it. Such is the case illustrated by the computation of $\theta_{est\_3}$ by means of the information item $\theta_1$ and of the delay $\Delta Tk$.

The invention relates also to a control method intended for an aircraft comprising a set of electrical machines 11 each equipped with a position sensor 12, and a number of inverters 13 supplied with electrical power by an onboard network of the aircraft, characterized in that it comprises the steps consisting in:
- collecting, for each electrical machine 11, a machine control setpoint and position information delivered by the position sensor of the electrical machine 11,
- determining, for each inverter 13, an inverter setpoint from the machine control setpoints of the set of electrical machines 11,
- generating, by each inverter 13, an electrical power signal as a function of the inverter setpoint and of the position information,
- supplying to each electrical machine 11 a supply electrical signal assembled from power electrical signals generated by one or more inverters 13.

In a particularly advantageous implementation, the method comprises the additional step consisting in determining, from the position information $\theta_0$ transmitted to the inverter according to a transfer frequency, an estimated position $\theta_{est}$ at a higher frequency than the transfer frequency; the estimated position $\theta_{est}$ replacing the position information $\theta_0$ to generate the power electrical signal.

The invention claimed is:

1. A modular power rack intended for an aircraft comprising a set of electrical machines, each equipped with a position sensor, and an onboard electrical network, comprising:
- a plurality of inverters, supplied with electrical power by the onboard electrical network,
- a supervision member comprising means for:
  - collecting, for each electrical machine, a machine control setpoint and position information delivered by the position sensor of the electrical machine,
  - determining, for each inverter, an inverter setpoint from the machine control setpoints of the set of electrical machines,
- a first communication channel, between the supervision member and each of the inverters, configured to transmit to each of the inverters the inverter setpoint determined by the supervision member,
- a second communication channel, between the supervision member and each of the inverters, configured to transmit position information to each of the inverters,
- a distribution device, which supplies to each electrical machine an electrical supply signal assembled from power electrical signals generated by the plurality of inverters, and
- synchronization means which associates a date stamp with each position information item delivered by the position sensors of each of the electrical machines; the date stamp associated with position information being also transmitted via the second communication channel,
- each of the inverters comprising means for generating a power electrical signal as a function of the inverter setpoint and of the position information transmitted by the supervision member respectively via the first and the second communication channels.

2. The modular power rack according to claim 1, wherein the first communication channel consists of a bus link.

3. The modular power rack according to claim 1, wherein the second communication channel consists of a set of bus links; a bus link linking each inverter to the supervision member.

4. The modular power rack according to claim 3, comprising synchronization means configured to associate a date stamp with each position information item delivered by the position sensors of each of the electrical machines, the date stamp associated with position information being also transmitted via the second communication channel, and wherein the date stamp associated with a position information item is a synchronization bit in a communication frame of the bus link transmitting the position information.

5. The modular power rack according to claim 1, wherein the first and the second communication channels consist of a single bus link linking the supervision member and the plurality of inverters, and transmitting both the inverter setpoints and the position information.

6. The modular power rack according to claim 1, wherein at least one inverter comprises means for computing, from the position information transmitted to the inverter according to a transfer frequency, an estimated position at a higher frequency than the transfer frequency; the estimated position replacing the position information to generate the power electrical signal.

7. The modular power rack according to claim 6, wherein the estimated position ($\theta_{est}$) is computed by means of a first order estimator implementing a relationship of a type:

$$\theta_{est} = \theta_0 + \omega_0 \times \Delta t$$

wherein $\theta_{est}$, $\theta_0$, $\omega_0$ and $\Delta t$ respectively represent the estimated position, the position information transmitted to the inverter, a rotation speed of a rotor estimated by the inverter, and an estimation of time elapsed since the date stamp.

8. The modular power rack according to claim 6, wherein the estimated position ($\theta_{est}$) is computed by means of a second order estimator implementing a relationship of a type:

$$\theta_{est} = \theta_0 + \omega_0 \times \Delta t + \gamma_0 \times \Delta t^2$$

wherein $\theta_{est}$, $\theta_0$, $\omega_0$, $\gamma_0$ and $\Delta t$ respectively represent the estimated position, the position information transmitted to the inverter, a rotation speed of a rotor estimated by the inverter, an acceleration of rotation of the rotor estimated by the inverter, and an estimation of time elapsed since the date stamp.

9. The modular power rack according to claim 1, wherein the date stamp associated with a position information item is determined by means of an additional physical signal.

10. A control method intended for an aircraft comprising a set of electrical machines each equipped with a position sensor, and a plurality of inverters supplied with electrical power by an onboard network of the aircraft, comprising:

collecting, for each electrical machine, a machine control setpoint and position information delivered by the position sensor of the electrical machine;

determining, for each inverter, an inverter setpoint from the machine control setpoints of the set of electrical machines;

generating, by each inverter, an electrical power signal as a function of the inverter setpoint and of the position information;

supplying to each electrical machine a supply electrical signal assembled from power electrical signals generated by at least one of the plurality of inverters; and determining, from the position information transmitted to an inverter according to a transfer frequency, an estimated position at a higher frequency than the transfer frequency; the estimated position replacing the position information to generate the power electrical signal.

* * * * *